April 23, 1935.   P. PAUTOU   1,998,788
STORAGE BATTERY
Original Filed May 12, 1931

PAUL PAUTOU
INVENTOR

BY Haseltine, Lake & Co.
ATTORNEYS

Patented Apr. 23, 1935

1,998,788

UNITED STATES PATENT OFFICE 1,998,788

STORAGE BATTERY

Paul Pautou, Colombes, France

Original application May 12, 1931, Serial No. 536,727. Divided and this application May 12, 1932, Serial No. 610,752. In France May 16, 1930

1 Claim. (Cl. 136—6)

The present application is a division of my former application bearing Serial No. 536,727, which was filed May 12, 1931.

This invention relates to improvements to storage batteries.

In modern motor carriages which use storage batteries on the one hand for starting their motors, and on the other hand for the ignition of such motor, it is absolutely necessary to obtain for such batteries the maximum power for a cost as low as possible. On another hand, owing to the fact that the starting electric motor causes the storage battery to be very quickly unloaded, the discharge of such battery being even in some cases brought to a very high degree by repeated attempts for starting the motor of the car, it frequently happens that when the gasoline motor has been at last put in motion, the tension between the terminals of said battery is no longer sufficient for providing for the ignition of the gasoline motor.

The storage battery according to my invention which remedies those defects comprises a particular arrangement of positive electrodes or plates: every positive plate has a part of its surface which is not located in front of adjacent negative plates, thus constituting in some way a sufficient reserve for securing the production of a current for the ignition of the motor, even after a difficult starting of the gasoline motor.

In the accompanying drawing which shows diagrammatical examples of a preferred form of an accumulator according to my invention:—

Figure 1:
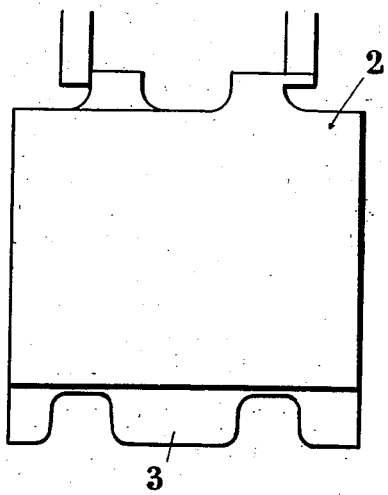
Fig. 1 is a diagrammatical front view of a bundle of positive and negative plates which are to constitute an accumulator or storage battery.
Figure 2:
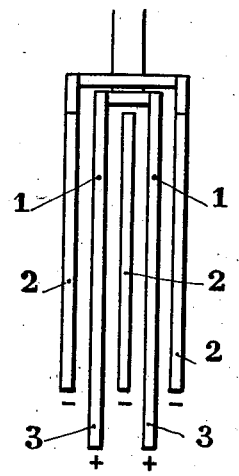
Fig. 2 is an end view of Fig. 1.

According to my present invention, in order to procure a reserve of energy once the gasoline motor started, the negative plates 2 are given a dimension which is conveniently smaller than that of positive plates 1, such positive plates 1 being preferably as pointed out in Figs. 1 and 2, lengthened towards their lower end showing thus a part 3 which protrudes over negative plates and constitutes a reserve which does not take part to quick discharges.

Thanks to this arrangement, if by oversight, the storage battery is discharged until practically exhausted when starting the gasoline motor of a motor-car, the part 3 of positive plates which is not located in front of negative plates, does not take part to the discharge and remains nearly intact and in a position, once the gasoline motor started, to furnish the current necessary for the ignition of said motor.

It may be said that at such time the negative substance in excess, and the active substance kept in the part 3 of positive plates, constitute in some way a second or auxiliary accumulator which is sufficient for providing an electric current for the ignition of the motor, such ignition requiring a current which is much lower than that of the starting.

Figure 3:
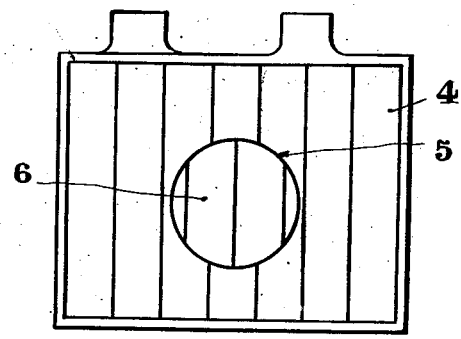
Fig. 3 is a modification of Fig. 1 showing another arrangement of the negative plate for allowing any positive plate to offer a part of its area out of correspondence with the area of the negative ones.

The part of positive plates which is not in correspondence or in front of the negative plates, could be located at any convenient part of the surface of such plates, for instance on a lateral side or better as shown in Fig. 3, every negative plate 4 could comprise in a convenient part of its surface an opening 5, the shape of which could be either circular, rectangular or otherwise, so that the corresponding part 6 of the adjacent positive plates is thus left completely disengaged, such part being not brought in action in the case of an intense discharge at the time of starting of the gasoline motor, such part 6 constituting the reserve for the provision of ignition current after starting.

In order to prevent the formation of any short-circuit which would be produced by the falling down of parts of active matter contained in the plates or electrodes, the grids of such electrodes are given sufficiently small dimensions for preventing the fragments of active matter from being retained or wedged between the adjacent plates when falling down. That is to say that the distance apart measured in the vertical direction between two adjacent elements of the grid or armature of a plate of accumulator, is equal or nearly equal to the distance apart which is left between two adjacent accumulator plates in position of operation. This structure is more specifically disclosed in my former application Serial No. 367,748 filed June 1, 1929.

As an example it may be said here that the distance apart of the plates being about 3 to 5 millimeters, the distance apart of the bars or horizontal elements which constitute every grid of an accumulator will be comprised between 3 and 5 millimeters.

My invention may be applied to storage batteries of any nature for every application, and more especially for motor vehicles.

What I claim is:—

In a storage battery adapted for starting and ignition on automobiles propelled by internal combustion engines, the combination with a plurality of positive plates, of a plurality of corresponding negative plates which are individually spaced from the positive plates and disposed practically within the outline of said positive plates and also have in each at least one extensive portion of their surface areas cut out from within the outline thereof in order to expose the corresponding portions of the positive plates within the outlines of the latter and retain a substantial reserve charge for the battery in said exposed portions after the other portions of the said positive plates have become more or less discharged.

PAUL PAUTOU.